(12) United States Patent   (10) Patent No.: US 7,444,754 B1
Hinshaw et al.   (45) Date of Patent: Nov. 4, 2008

(54) WHEEL ALIGNMENT APPARATUS AND METHOD FOR ALL-TERRAIN VEHICLES

(75) Inventors: Joseph Hinshaw, Florence, SC (US); Kyle DuBridge, Turbeville, SC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/972,380

(22) Filed: Jan. 10, 2008

(51) Int. Cl.
*G01B 5/255* (2006.01)
*G01C 15/00* (2006.01)

(52) U.S. Cl. .................. 33/203.18; 33/600; 33/645; 33/613

(58) Field of Classification Search ............ 33/203, 33/203.18, 600, 645, 677, 678, 832, 203.12, 33/613, 666, 286, 288, DIG. 21
See application file for complete search history.

(56) References Cited

U.S. PATENT DOCUMENTS

| | | | |
|---|---|---|---|
| 4,893,413 A | 1/1990 | Merrill et al. | |
| 5,027,275 A | 6/1991 | Sakamoto et al. | |
| 5,027,524 A * | 7/1991 | Metcalf et al. | 33/600 |
| 5,105,546 A | 4/1992 | Weise et al. | |
| 5,832,617 A | 11/1998 | Gill | |
| 5,919,238 A | 7/1999 | Lavey | |
| 6,082,011 A * | 7/2000 | Phillips, III | 33/203.15 |
| 6,240,648 B1 * | 6/2001 | Dolph | 33/203.18 |
| 6,543,145 B2 * | 4/2003 | Lovesy | 33/203 |
| 6,675,488 B2 * | 1/2004 | Duke | 33/203.18 |
| 7,007,395 B2 * | 3/2006 | Douglas | 33/288 |
| 7,412,773 B2 * | 8/2008 | Hobel et al. | 33/286 |
| 2001/0009070 A1 * | 7/2001 | Lovesy | 33/203 |
| 2002/0088128 A1 * | 7/2002 | Bremer | 33/286 |
| 2005/0268475 A1 * | 12/2005 | Hobel et al. | 33/286 |

* cited by examiner

*Primary Examiner*—Yaritza Guadalupe-McCall
(74) *Attorney, Agent, or Firm*—Standley Law Group LLP

(57) ABSTRACT

An apparatus and method for aligning the wheels of an all-terrain vehicle (ATV). The apparatus includes a wheel alignment fixture and a wheel position indicator adapted for releasable attachment to an all-terrain vehicle. The wheel alignment fixture and the wheel position indicator cooperate to indicate the alignment of a wheel of the ATV. The wheel position indicator may project a light beam at an indicating element portion of the wheel alignment fixture for this purpose. Preferably, a steering centering fixture is also provided to ensure that the steering of the all-terrain vehicle remains centered during the wheel alignment process.

20 Claims, 9 Drawing Sheets

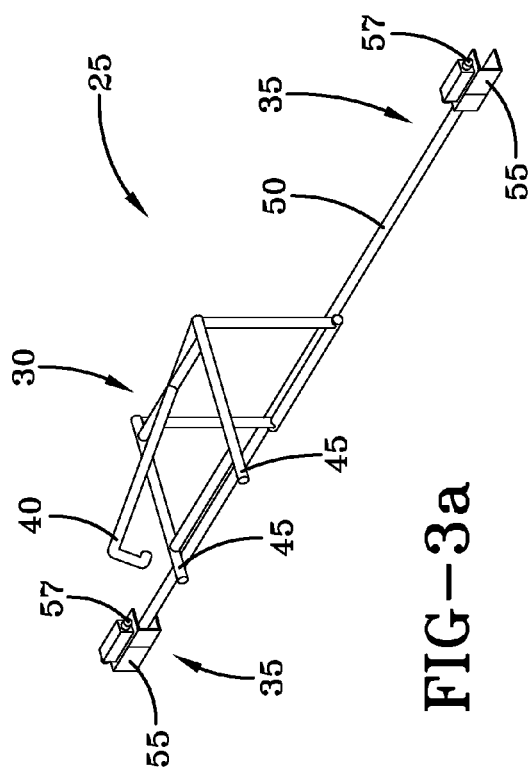
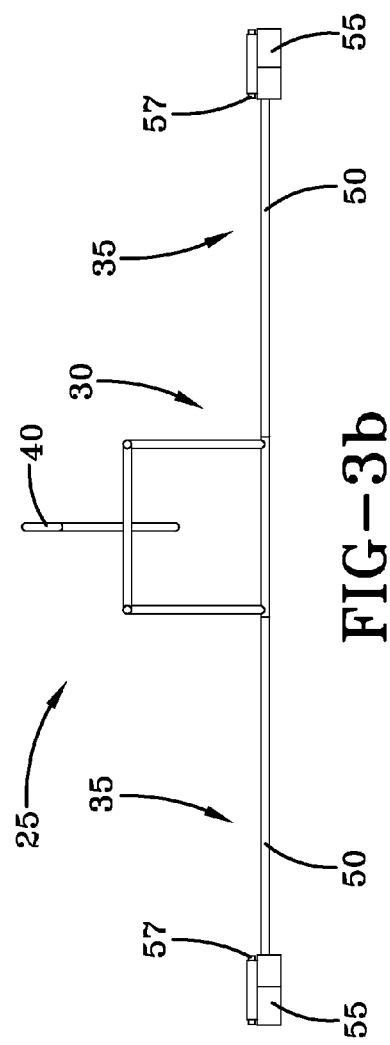
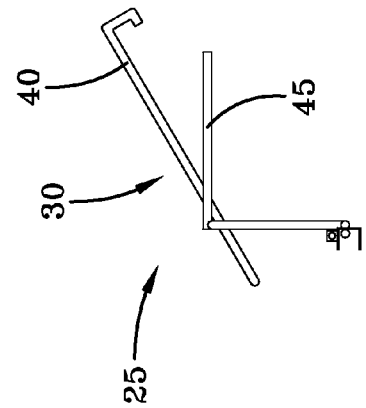

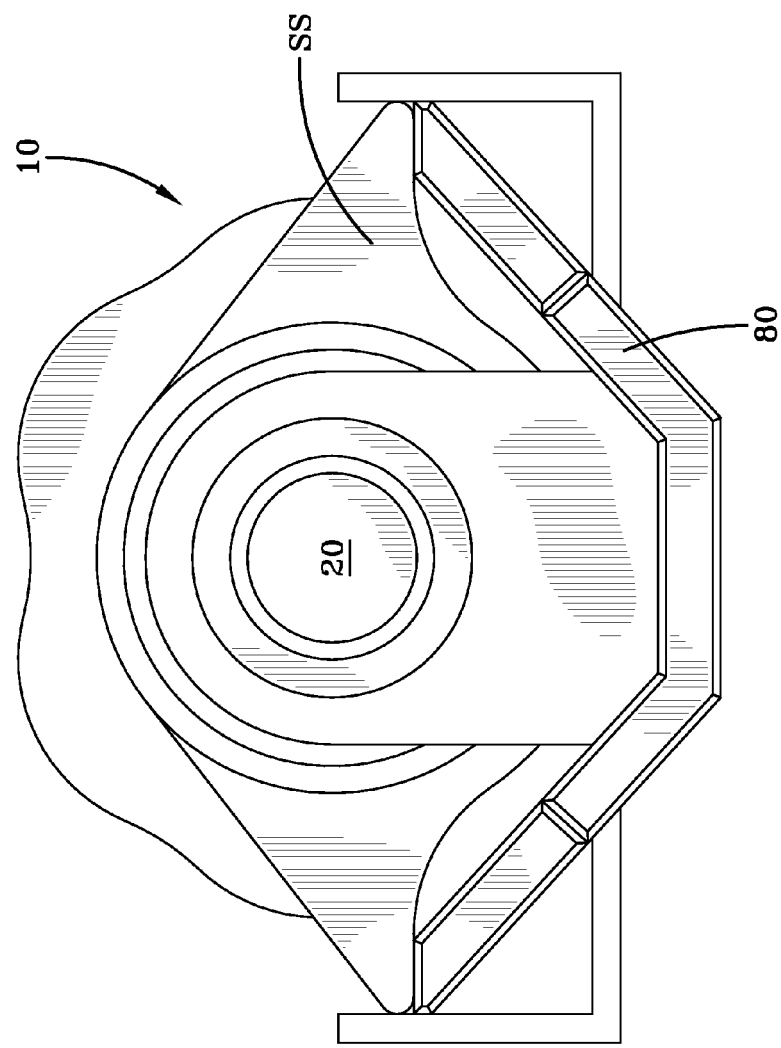

US 7,444,754 B1

WHEEL ALIGNMENT APPARATUS AND METHOD FOR ALL-TERRAIN VEHICLES

BACKGROUND OF THE INVENTIVE FIELD

The present invention is directed to an apparatus and method for aligning the wheels of an all-terrain vehicle. More particularly, the present invention is directed to an apparatus and method that can be used to set the toe angle while centering the steering of an all-terrain vehicle.

All-terrain vehicles (ATVs) have existed in various forms for forty years or more. Generally, ATVs are motorized vehicles designed for off-road use, with large low-pressure tires to allow for the traversal of rough terrain. A number of ATV designs exist, or have existed in the past. For example, early ATVs were typically large enough to accommodate multiple passengers, and usually had six or more wheels. These early ATVs generally had no suspension but, rather, relied on their over-sized tires to cushion the ride. Operation of these ATVs was commonly accomplished using a foot-operated throttle pedal and a pair of hand controls (sticks).

Subsequent to these early ATV designs, smaller and lighter ATVs were developed. These newer ATVs were designed to carry only one, or possibly two, passengers. The first of these newer ATVs was of a three wheel design. Although these three-wheeled ATVs also initially lacked a suspension, suspensions were added to later models. Unlike their larger predecessors, these three-wheeled ATVs were designed to be ridden, as opposed to being sat in. More particularly, these three-wheeled ATVs were provided with a seat that that was straddled by the rider during operation (much like a motorcycle), and with foot pegs for resting of the rider's feet. Steering was accomplished via handlebars.

Eventually, three-wheeled ATVs gave way to a four-wheeled ATV design, which is the predominant ATV design in existence today. In addition to gaining a wheel, ATVs have been become much more refined than their earlier counterparts. For example, modern ATVs typically have sophisticated suspensions that allow for their operation over very harsh terrain. Modern ATVs may also be liquid-cooled, and may be equipped with features such as automatic transmissions and power steering.

While features such as those listed above may render modern ATVs easier to operate and more comfortable to ride, such features also demand a more complex manufacturing process. For example, modern ATV suspensions and steering systems may require setup procedures similar to those found in an automobile manufacturing process. Additional features such as power steering further complicate manufacturing.

Unlike automobile manufacturing, however, ATV manufacturing typically occurs on a much smaller and more streamlined assembly line. Consequently, certain dedicated and permanently located manufacturing equipment, such as wheel alignment machines, may not be available on an ATV assembly line. Rather, it is preferred that simple and transportable equipment be used for such purposes. The present invention is directed to such equipment and methods of practicing particular ATV manufacturing operations.

SUMMARY OF THE GENERAL INVENTIVE CONCEPT

The present invention relates to ATV wheel alignment and to the centering of ATV steering. More particularly, the present invention is directed to an apparatus and method for setting ATV toe angle while simultaneously ensuring that the steering mechanism of the associated ATV is properly centered. While apparatus of the present invention are ideally used during an ATV manufacturing operation, it is possible that apparatus of the present invention may also be used on a previously assembled ATV.

An apparatus of the present invention includes a wheel alignment fixture, at least one wheel position indicator, and a steering centering fixture. In use, the wheel alignment fixture is removably installed to a forward portion of the ATV frame, and the steering centering fixture is removably installed to a steering assembly of the ATV. A wheel position indicator is installed to the hub of each ATV wheel requiring adjustment. A single wheel position indicator may be used and moved from wheel to wheel, or an individual wheel position indicator may be provided for each wheel of the ATV requiring alignment.

A wheel position indicator of the present invention preferably includes an emitter portion, such as a laser, that is able to project onto the wheel alignment fixture the position of the wheel to which the wheel position indicator is attached. For example, when a laser-based wheel position indicator is used, a laser beam is directed at the wheel alignment fixture. The wheel alignment fixture may have one or more markings or other features that cooperate with the laser beam to provide an indication of the current position of the ATV wheel with respect to its proper/desired position. The ATV wheel can then be moved until the laser beam (or other indicator mechanism) is properly aligned with the appropriate marking or other feature of the wheel alignment fixture.

During positioning of the ATV wheels, the steering centering fixture ensures that the ATV steering column remains centered. As such, there will be no bias of the steering toward either side of the ATV during its operation. As would be understood by those skilled in the art, apparatus of the present invention may be used to set a number of ATV wheel characteristics, of which only toe angle is exemplified in more detail below for purposes of illustration.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIGS. 3a-3c are isometric, rear and right side views, respectively, of one exemplary embodiment of a wheel alignment fixture of the present invention;

FIG. 8 shows the steering centering fixture of FIGS. 7a-7c in position on a steering assembly of an ATV.

DETAILED DESCRIPTION OF EXEMPLARY EMBODIMENT(S)

Figure 1A:
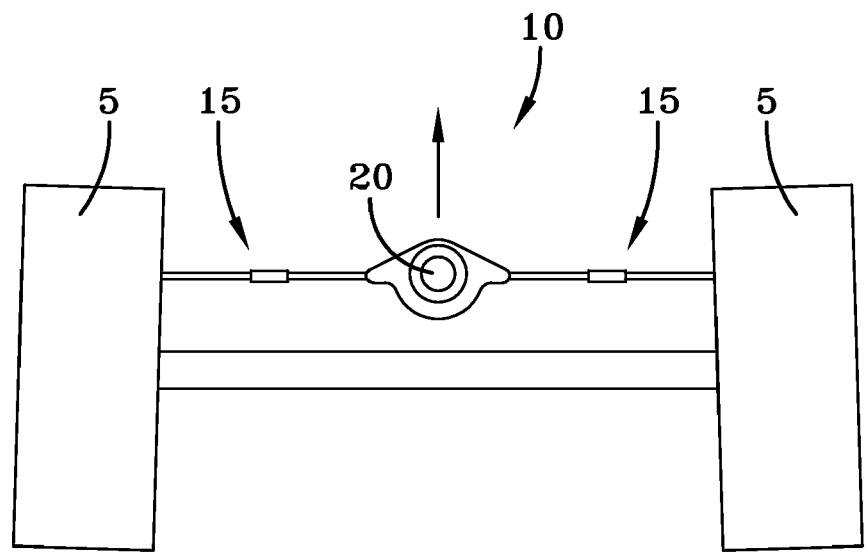
FIGS. 1a-1b illustrates the concept of toe angle.
Figure 1B:
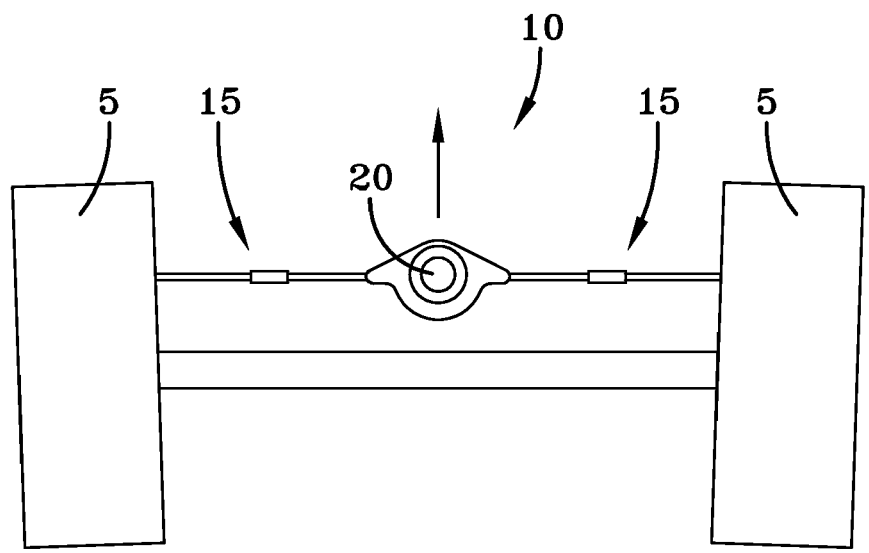

FIGS. 1a-1b graphically represent the basic concept of toe angle. None of the components shown in FIGS. 1a-1b or their shape, size or positioning should be taken to depict actual ATV components. Rather, the components shown in FIGS. 1a-1b are provided only to impart a basic understanding of toe angle and, as such, the shape and size of such has been arbitrarily selected.

FIGS. 1a-1b represent a top plan view of the front wheels and certain steering components of an ATV, with the front and forward travel direction of the ATV indicated by the arrows. As shown in both FIG. 1a and FIG. 1b, the front wheels 5 are connected to a steering mechanism 10 by a pair of tie rods 15. The steering mechanism 10 includes a steering column 20 to which handlebars are eventually connected. The steering mechanism 10 may include a variety of other components, as would be understood by those skilled in the art.

Toe angle is typically measured in degrees, or as a difference in the distance between the wheels (or tires) along the front and rear thereof. As such, a neutral toe angle (or zero toe angle) would have an angle of zero and the distance between the wheels measured along both the front and rear thereof would be the same. In contrast, FIG. 1a illustrates an ATV with its front wheels set in a toe-in position. That is, the fronts of the wheels are angled slightly toward one another, such that the distance between the front of the wheels is less than the distance between the rear of the wheels. FIG. 1b illustrates an ATV with its front wheels set in a toe-out position. That is, the rears of the wheels are angled slightly toward one another, such that the distance between the rear of the wheels is less than the distance between the front of the wheels. The use of toe-in and toe-out settings, as well as the degree of either, may vary between ATVs. Toe angle is typically adjusted and set using the tie rods 15, as is described in more detail below.

Figure 2B:
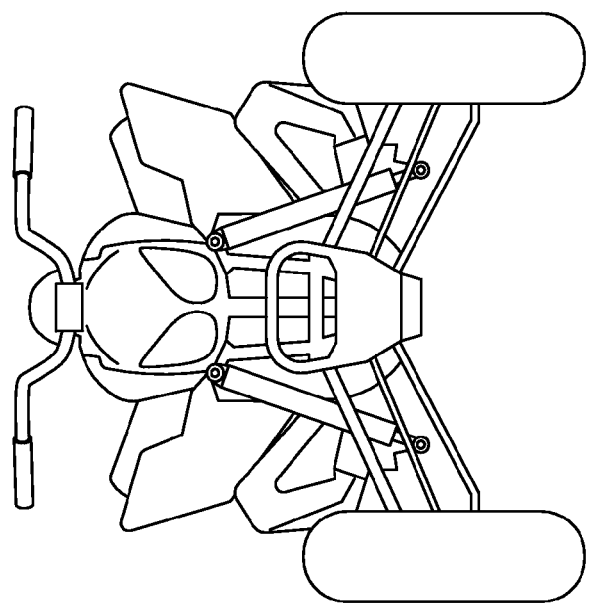
FIGS. 2a and 2b are front views of exemplary ATVs that may have toe angle set using apparatus and methods of the present invention.
Figure 2A:
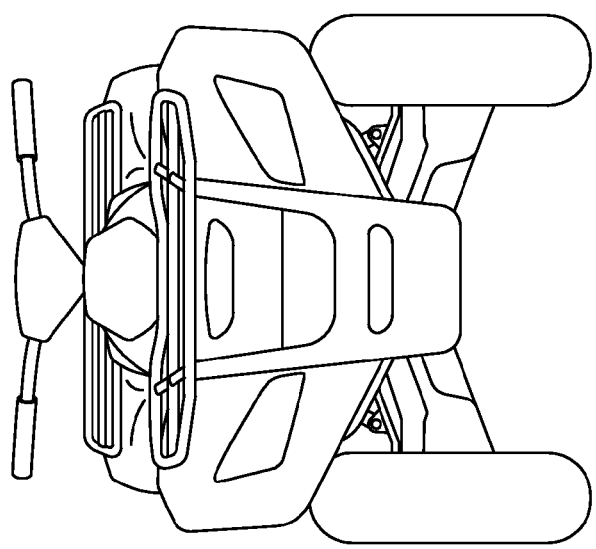

A front view of two exemplary ATVs is provided in FIGS. 2a and 2b. As can be seen, the body style and suspensions of ATVs can vary considerably between models and/or brands. While a unique apparatus of the present invention may be provided for each ATV in need of a toe angle check or setup, an apparatus of the present invention may also be designed for use with many different ATVs.

Apparatus of the present invention generally include a wheel alignment fixture that can be quickly and easily attached to and removed from an ATV of interest, and at least one wheel position indicator for acting in conjunction with the wheel alignment fixture to indicate the toe angle of the front wheels of said ATV. Apparatus of the present invention also preferably comprise a steering centering fixture for ensuring that the steering mechanism is in a centered position during toe angle setting/adjustment.

One exemplary embodiment of a wheel alignment fixture of the present invention is depicted in FIGS. 3a-3c. This particular wheel alignment fixture 25 is constructed as a largely open tubular framework that can be easily attached to and removed from an ATV of interest. The framework includes an ATV frame engaging portion 30 with laterally extending alignment portions 35 attached thereto.

Figure 4:
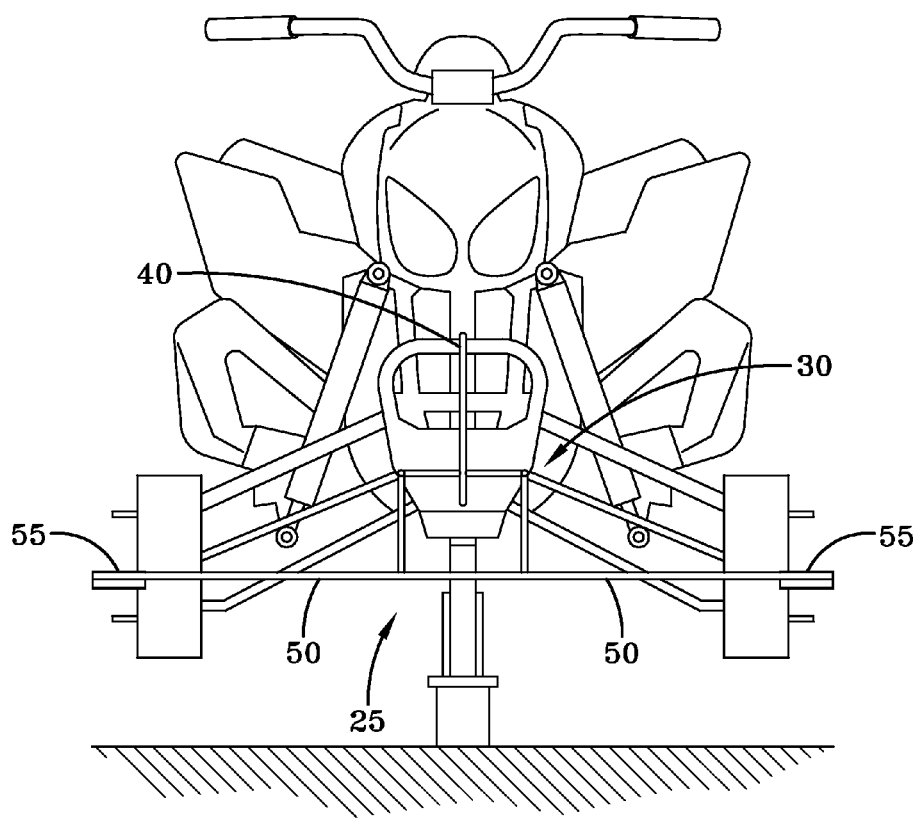
FIG. 4 shows the wheel alignment fixture of FIGS. 3a-3c mounted to an ATV.

As can be best observed in FIG. 4, the wheel alignment fixture 25 is designed for removable attachment to a forward portion of an ATV frame. Particularly, the frame engaging portion 30 is designed to engage one or more sections of the ATV frame. As would be understood by those of skill in the art, the particular points of engagement between a wheel alignment fixture of the present invention and different ATVs may vary based on the ATV design. Preferably, however, a wheel alignment fixture of the present invention is designed to engage at least one point common to a number of ATVs or is otherwise designed to properly engage and be useable with a number of different ATVs. This may be accomplished in various ways that would be apparent to those of skill in the art, such as by employing locating points common to several ATVs and/or shaping a wheel alignment fixture such that it provides a number of different engaging/locating surfaces for contact with particular surfaces of different ATVs. Attachment of different embodiments of a wheel alignment fixture of the present invention may be accomplished using the ATV frame and/or other components/surfaces of an ATV.

As can be seen in FIGS. 3a-3c and FIG. 4, this particular wheel alignment fixture 25 includes an extending hook-shaped retention element 40 that is designed to engage a substantially horizontally-oriented ATV frame member, such as by passing through an existing hole therein. In conjunction therewith, the wheel alignment fixture 25 also includes a pair of rearward-extending support members 45 that contact and engage other existing ATV frame members subsequent to engagement of the hook-shaped retention element 40. This combination of engaging/locating elements allows the wheel alignment fixture 25 to be quickly and easily installed to and removed from ATVs of interest, while simultaneously ensuring that the wheel alignment fixture is repeatably and properly positioned with respect thereto. It is to be understood, of course, that this particular wheel alignment fixture design and method of ATV frame engagement are provided solely for the purpose of illustration, and nothing herein is to be considered as limiting the scope of the present invention to any such design and/or engagement technique. Rather, a wheel alignment fixture of the present invention can be adapted for installation to virtually any number of ATVs.

The alignment portions 35 of the wheel alignment fixture 25 can be seen to extend laterally outward from each side of the frame engaging portion 30. In this particular embodiment, the alignment portions 35 are each shown to include an elongate arm 50 having an indicating element 55, such as the plate shown. The length of the elongate arms 50 may vary depending on the ATVs with which the wheel alignment fixture 25 will be used.

Referring again to FIG. 4, it can be observed that the length of the elongate arms 50 is preferably selected to substantially align the indicating elements 55 with the wheels of interest on the ATV. The elongate arms 50 of this embodiment of the wheel alignment fixture 25 are shown to extend substantially horizontally with respect to the ground when the wheel alignment fixture is installed to an ATV. It should be realized, however, that other elongate arm designs and/or other means of properly locating the indicating elements 55 are also possible.

Although the indicating elements 55 are shown to be plates in this exemplary embodiment, it should be realized that various indicating element designs may be used. In fact, an indicating element of the present invention may be of virtually any design capable of providing an indication of proper wheel alignment, such as surfaces of various size and shape.

Indicating elements may also be integral to the elongate arms or the elongate arms may form the indicating elements. Indicating elements may also include various devices that can register communication with an emitter of a wheel position indicator 60, such as reflective devices or electronic devices that are responsive to a light signal.

As can be best observed in FIGS. 3a-3b, and FIG. 4, the indicating elements 55 of this exemplary embodiment are preferably provided with a position register, such as a marking or other feature capable of indicating the proper alignment of an ATV wheel of interest. In this particular embodiment, the position register is a substantially vertical indicator line L that cooperates with an output from a wheel position indicator 60 to indicate the proper toe angle of an associated ATV wheel. Obviously, a position register comprising any number of other markings or features may be present on the indicating element 55. When a wheel alignment fixture 25 of the present invention is used to align the wheels of more than one ATV, more than one marking or feature may be present on the indicating element 55.

The indicating element 55 may also be adjustable such that the position register(s) residing thereon can be adjusted relative to the position of a wheel of an ATV to which the associated wheel alignment fixture 25 is mounted. This adjustability may be used to fine tune the indicated alignment position, to accommodate changes to ATV wheel alignment settings, etc. The amount of adjustability may vary.

As can be best observed in FIGS. 3b-3c, the indicating elements 55 of this particular wheel alignment fixture 25 can be moved within some distance along the length of the elongate arms 50. In other words, the position of the indicating elements 55 can be adjusted inwardly and outwardly with respect to the position of an associated ATV wheel. The amount and/or direction of adjustment may be different in other embodiments of the present invention.

In this exemplary embodiment, adjustment of the indicating elements 55 is accomplished via a threaded adjuster 57 that connects the indicating elements to a portion of the elongate arms 50. Rotation of a threaded adjuster 57 causes a translation of its associated indicating element 55 along the length of the associated elongate arm 50. The direction of translation is determined by the direction of rotation of the threaded adjuster 57. As would be apparent to one skilled in the art, a variety of alternative adjusting means/techniques may also be employed for this purpose, and all are considered to be within the scope of the present invention.

Figure 5A:
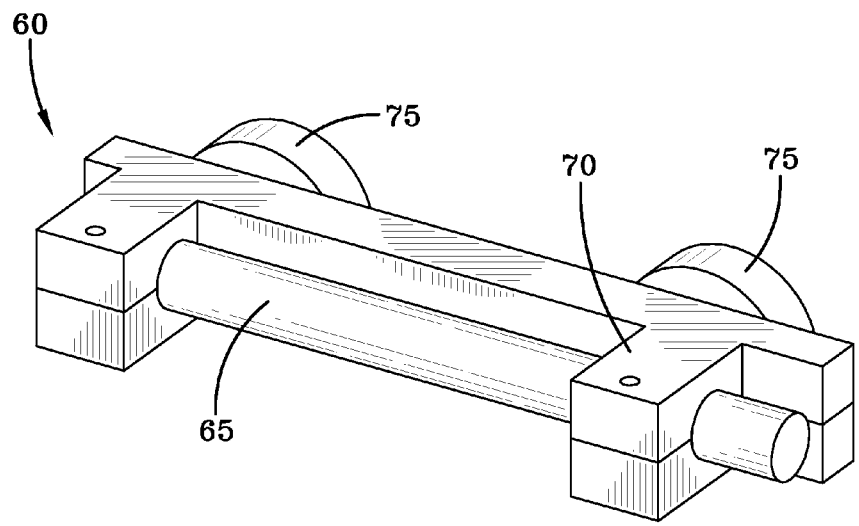
FIGS. 5a-5b are illustrative of one exemplary embodiment of a wheel position indicator of the present invention.
Figure 5B:
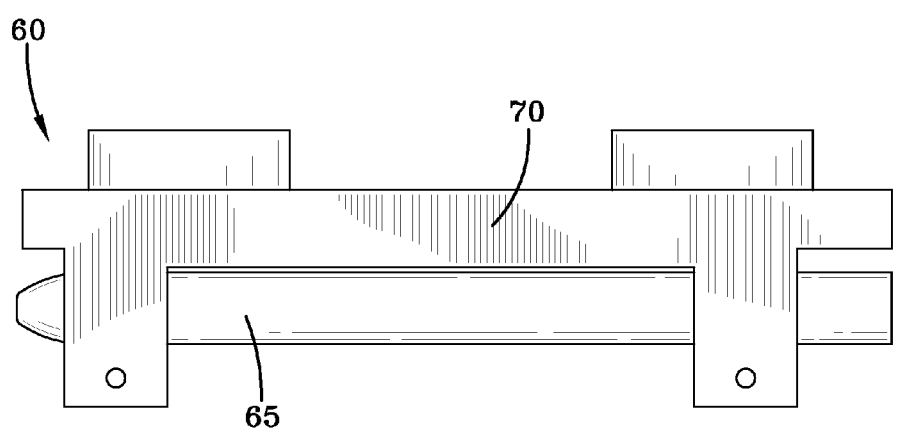
Figure 6:
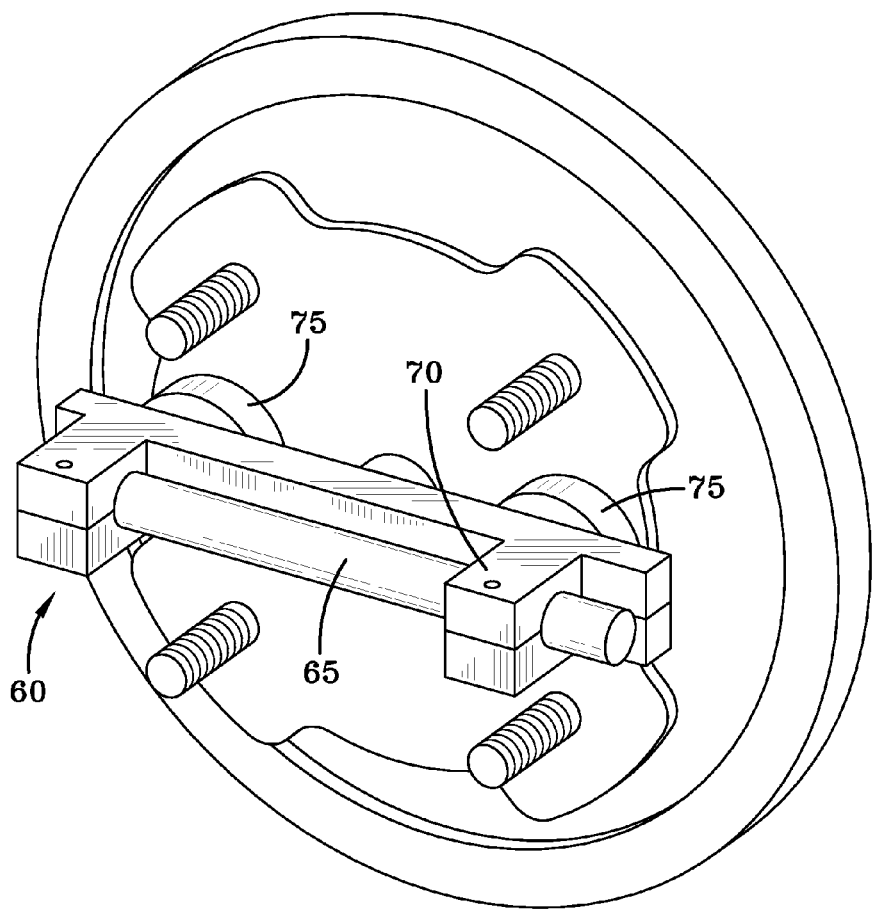
FIG. 6 shows the wheel position indicator of FIGS. 5a-5b mounted to a wheel hub of an ATV.

One exemplary embodiment of a wheel position indicator is depicted in FIGS. 5a-5b. In this embodiment, the wheel position indicator 60 is comprised generally of a laser emitter 65 secured within a housing 70 that facilitates temporary attachment of the wheel position indicator to a wheel hub of an ATV. More particularly, this embodiment of the housing 70 includes a number of magnets 75 that allow for removable magnetic attachment of the wheel position indicator 60 to a wheel hub of an ATV.

As would be apparent to one skilled in the art, a number of other wheel position indicator 60 mounting techniques may also be employed and such alternative techniques are considered to be within the scope of the present invention. For example, and without limitation, a housing designed to engage one or more wheel lugs, a brake rotor, or another part(s) of a wheel may also be employed, as may other techniques that allow a wheel position indicator to be acceptably and repeatedly located to a wheel to be aligned.

Figure 9:
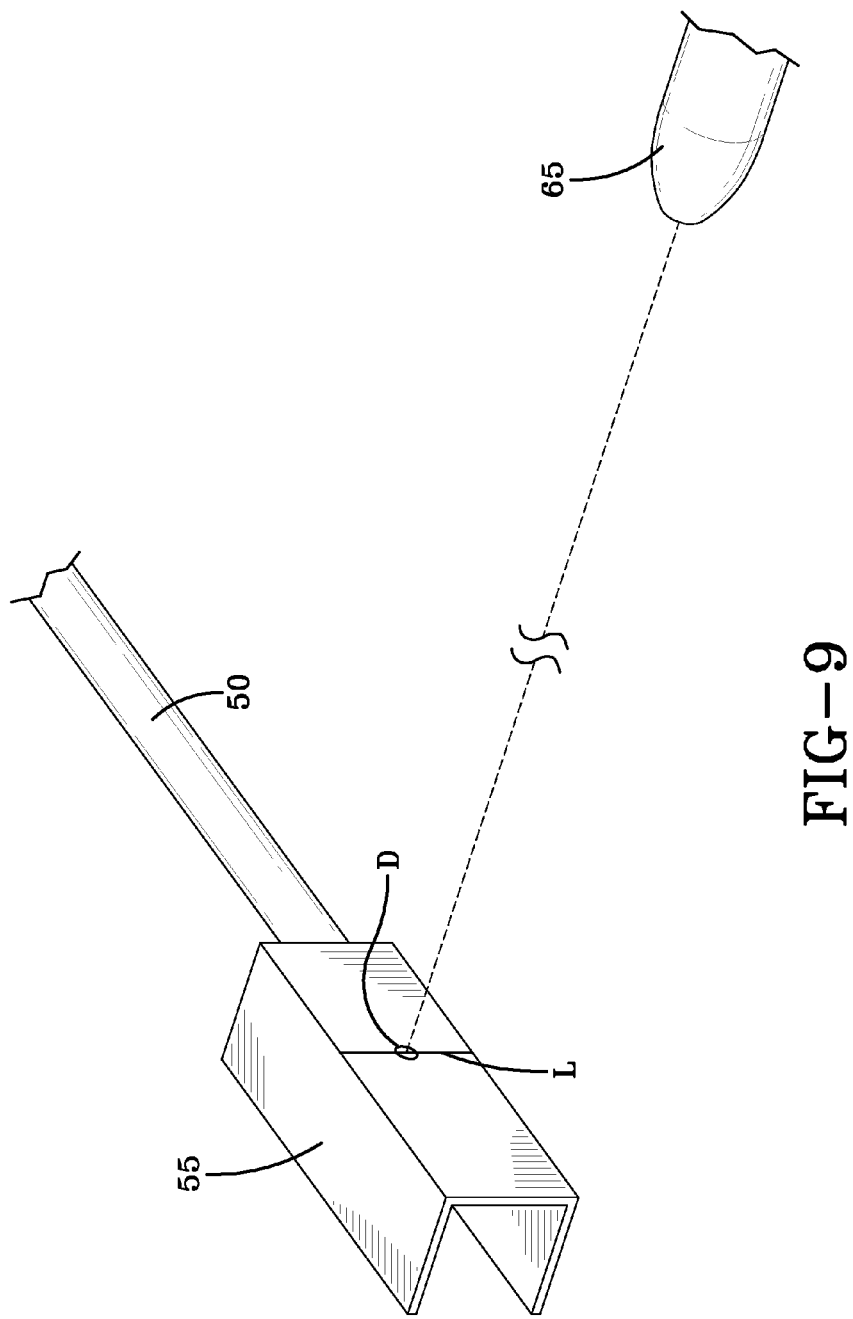
FIG. 9 illustrates a light beam from the wheel position indicator of FIG. 8 striking a portion of the wheel alignment fixture of FIG. 4.

As will be described in more detail below, and as is illustrated in FIG. 9, the laser emitter 65 of the wheel position indicator 60 projects a laser beam that is used in conjunction with the wheel alignment fixture 25 to properly align an associated wheel of an ATV. Other indicating means may replace the laser emitter 65 in other embodiments of a wheel position indicator 60 of the present invention, such as other types of light-emitting devices. It is also possible to practice the present invention using a mechanical wheel position indicator in lieu of a laser emitter or other light-emitting device. For example, alternate embodiments of the present invention may include an indicator arm that attaches to and extends from a wheel of interest toward the wheel alignment fixture 25. The free end of the indicator arm may form or include a pointing or other indicating element that can be aligned with the vertical indicator line L of the wheel alignment fixture 25 to indicate proper toe angle. Alternatively, the wheel alignment fixture 25 may be modified to include a feature (e.g., hard stop, etc.) that, when contacted by the indicator arm, indicates proper toe angle.

Figure 7A:
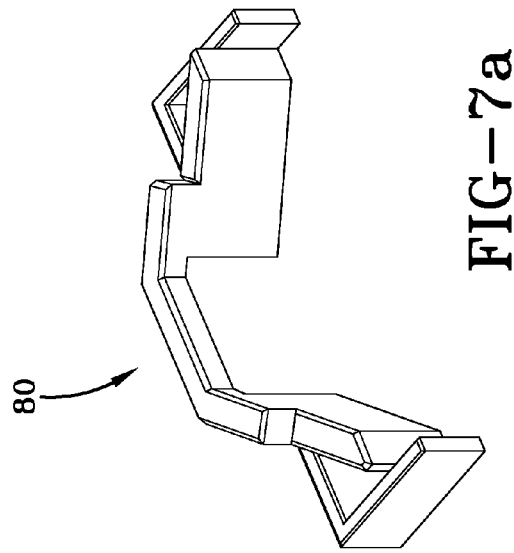
FIGS. 7a-7c show various views of one exemplary embodiment of a steering centering fixture of the present invention.
Figure 7B:
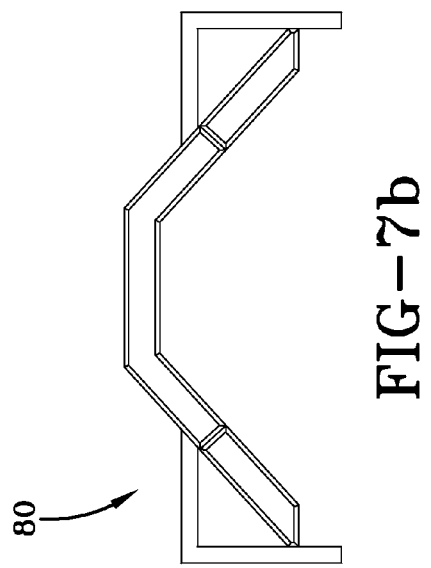
Figure 7C:
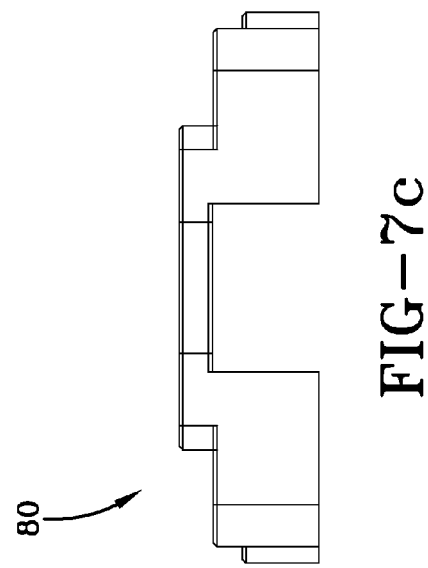

One embodiment of a steering centering fixture 80 of the present invention is depicted in FIGS. 7a-7c. This particular steering centering fixture 80 is designed for use with a particular steering assembly of one or some number of associated ATVs (as shown in FIG. 8). As such, it is to be understood that a steering centering fixture of the present invention may be of a different size and or shape, while still providing the desired steering centering function.

As can be observed in FIGS. 7a-7c and FIG. 8, this particular steering centering fixture 80 is comprised of a multi-angled bracket that is adapted to engage a portion of an ATV steering assembly. As shown in FIG. 8, the steering centering fixture 80 is designed to accommodate various components of the ATV steering assembly.

When properly engaged with the steering assembly, the steering centering fixture 80 ensures that the steering column of the ATV resides in a centered position while the wheels of the ATV are aligned (as described below). This centering function may be accomplished by positioning the steering column itself and/or one or more other components associated with the steering column. As can be best observed in FIG. 8, this particular embodiment of the steering centering fixture 80 operates by contacting and positioning a steering arm stopper SS that rotates with the steering column, such that the steering column is properly centered. Once positioned by the steering centering fixture 80, further rotation is prevented. Consequently, it can be ensured that the steering of an ATV will remain centered during the wheel alignment process.

As shown in FIG. 8, a steering centering fixture of the present invention may be designed for use on ATVs with power steering. Alternate embodiments may be designed for and used on ATVs without power steering.

A steering alignment apparatus comprising the wheel alignment fixture 25, steering centering fixture 80 and at least one wheel position indicator 60 cooperate to allow for proper alignment of the wheels of an ATV while simultaneously ensuring that the steering of the ATV remains centered. An exemplary method of using the apparatus is described in detail below. In this particular example, the apparatus is used to set the toe angle of the wheels of an ATV while the ATV traverses an assembly line. It should be realized, of course, that an apparatus of the present invention can also be used to align the wheels of a previously assembled ATV. Further, while this exemplary method is described below as occurring in certain steps, it is to be understood that the various steps associated with the use of an apparatus of the present invention can occur in an order different from that described.

In operation, the wheel alignment fixture 25 is removably installed to an ATV of interest as described above. If not already connected, the tie rods associated with the ATV wheels of interest are connected and threaded to a temporary setting position. With the tie rods connected, the ATV steering assembly is rotated, if needed, so as to allow for the removable installation of the steering centering fixture 80—which engages a portion of the steering assembly as described above.

With the steering of the ATV properly centered by the steering centering fixture, a wheel position indicator 60 is removably installed (magnetically, in this case) to the hub of the ATV wheel to be aligned, and the laser emitter 65 thereof is powered on (if necessary). As shown in FIG. 9, the laser emitter 65 projects a beam of light that strikes the indicating element 55 of the wheel alignment fixture 25. In this case, the light beam projected by the laser emitter 65 is focused into a dot D, but the emitter could also project a line, an arrow, or any number of other shapes on the indicating element.

The user of the apparatus may then further adjust the tie rod associated with the wheel being aligned, such that wheel is turned inwardly or outwardly a sufficient amount to cause the laser dot D to correspond to the indicator line L (as shown in FIG. 9) or other position register present on the indicating element 55. In this case, alignment of the laser dot D with the indicator line L on the indicating element 55 represents the proper toe angle setting for the associated ATV wheel. Once this alignment process is completed, the tie rod of the associated ATV wheel can be securely tightened to ensure that the toe angle of the wheel remains properly set.

While the particular exemplary embodiment described herein is directed to setting toe angle, it would be apparent to one skilled in the art that an apparatus and method of the present invention could be used to perform other ATV wheel alignment functions, such as setting wheel camber. For example, a wheel position indicator 60 of the present invention may be provided with a laser emitter 65 that projects a line, instead of a dot, onto the indicating element 55. Alignment of this laser line with an angled line or other position register on the indicating element 55 may be used to adjust and set wheel camber when and if appropriate.

Therefore, it can be seen from the foregoing general discussion and description of the exemplary embodiments, that variations of the present invention are possible. As such, while certain embodiments of the present invention are described in detail above, the scope of the invention is not to be considered limited by such disclosure, and modifications are possible without departing from the spirit of the invention as evidenced by the following claims:

What is claimed is:

1. An apparatus for aligning all-terrain vehicle wheels, comprising:
    a wheel alignment fixture adapted for releasable attachment to said all-terrain vehicle, said wheel alignment fixture having an indicating element adapted to cooperate with a wheel position indicator so as to indicate the alignment of an all-terrain vehicle wheel of interest;
    a wheel position indicator adapted for releasable attachment to said wheel of interest, said wheel position indicator including a light beam emitter for projecting a light beam at said indicating element of said wheel alignment fixture when said wheel alignment fixture and said wheel position indicator is attached to said all-terrain vehicle; and
    a steering centering fixture for ensuring that the steering of said all-terrain vehicle is properly centered during wheel alignment;
    wherein the correspondence of said light beam with a position register of said indicating element of said wheel alignment fixture indicates proper alignment of said wheel of interest.

2. The apparatus of claim 1, wherein said wheel alignment fixture is a substantially open frame that hangs from a forward frame portion of said all-terrain vehicle.

3. The apparatus of claim 1, wherein the position of said indicating element on said wheel alignment fixture is adjustable.

4. The apparatus of claim 1, wherein said position register of said wheel alignment fixture indicating element is a mark.

5. The apparatus of claim 4, wherein said mark is a line.

6. The apparatus of claim 1, wherein said wheel position indicator is magnetically attached to a hub portion of said wheel of interest.

7. The apparatus of claim 1, wherein said light beam emitter is a laser.

8. The apparatus of claim 1, wherein said steering centering fixture is a bracket that prevents rotation of a steering column after installation to said all-terrain vehicle.

9. The apparatus of claim 1, wherein said position register of said wheel alignment fixture indicating element represents a proper toe angle setting position for said wheel of interest.

10. An apparatus for aligning the front wheels of an all-terrain vehicle, comprising:
    a wheel alignment fixture adapted for releasable attachment to a frame of said all-terrain vehicle, said wheel alignment fixture having indicating elements that are substantially aligned with and reside forward of said front wheels of said all-terrain vehicle when said wheel alignment fixture is properly attached thereto;
    at least one wheel position indicator adapted for releasable attachment to a hub portion of said front wheels, said at least one wheel position indicator including a light beam emitter for projecting a light beam at a corresponding one of said indicating elements of said wheel alignment fixture when said wheel alignment fixture and said at least one wheel position indicator are attached to said all-terrain vehicle; and
    a steering centering fixture adapted to engage a portion of a steering assembly of said all-terrain vehicle, said steering centering fixture for ensuring that the steering of said all-terrain vehicle is properly centered during wheel alignment;
    wherein the correspondence of said light beam with a position register of a corresponding indicating element of said wheel alignment fixture indicates proper alignment of an associated wheel of said all-terrain vehicle.

11. The apparatus of claim 10, wherein said wheel alignment fixture is a substantially open frame that hangs from a forward frame portion of said all-terrain vehicle.

12. The apparatus of claim 10, wherein the position of said indicating elements on said wheel alignment fixture is adjustable.

13. The apparatus of claim 10, wherein said position register of said wheel alignment fixture indicating element is a mark.

14. The apparatus of claim 13, wherein said mark is a line.

15. The apparatus of claim 10, wherein said wheel position indicator is magnetically attached to a hub portion of an associated all-terrain vehicle wheel.

16. The apparatus of claim 10, wherein said light beam emitter is a laser.

17. The apparatus of claim 10, wherein said steering centering fixture is a bracket that prevents rotation of a steering column after installation to said all-terrain vehicle.

18. A method for setting the toe angle of an all-terrain vehicle wheel, comprising:
    (a) providing a wheel aligning apparatus, said apparatus further comprising:
        a wheel alignment fixture adapted for releasable attachment to said all-terrain vehicle, said wheel alignment fixture having an indicating element adapted to cooperate with a wheel position indicator,
        a wheel position indicator adapted for releasable attachment to said wheel, said wheel position indicator including a light beam emitter for projecting a light beam at said indicating element of said wheel alignment fixture when said wheel alignment fixture and said wheel position indicator are attached to said all-terrain vehicle, and a steering centering fixture for ensuring that at least a steering column of said all-terrain vehicle is properly centered during setting of the toe angle, (b) removably attaching said wheel alignment fixture to said all-terrain vehicle;

(c) if not already connected, connecting and partially threading a tie rod associated with said wheel;

(d) removably attaching said steering centering fixture to said all-terrain vehicle;

(e) removably attaching said wheel position indicator to said all-terrain vehicle;

(f) if not already energized, energizing said light beam emitter of said wheel position indicator to project a light beam onto said indicating element of said wheel alignment fixture;

(g) adjusting said tie rod to move said wheel until said light beam contacts a position register of said indicating element of said wheel alignment fixture; and (h) tightening said tie rod.

19. The method of claim 18, wherein the setting of toe angle occurs during the manufacturing of said all-terrain vehicle.

20. The method of claim 18, wherein said wheel position indicator is magnetically attached to a hub portion of said wheel.

* * * * *